United States Patent
Zlotnick

(10) Patent No.: US 6,950,533 B2
(45) Date of Patent: Sep. 27, 2005

(54) SORTING IMAGES FOR IMPROVED DATA ENTRY PRODUCTIVITY

(75) Inventor: Aviad Zlotnick, D.N. Galil Takhton (IL)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 09/917,719

(22) Filed: Jul. 31, 2001

(65) Prior Publication Data

US 2003/0026507 A1 Feb. 6, 2003

(51) Int. Cl.⁷ .................................................. G06K 9/00
(52) U.S. Cl. ...................................... 382/100; 382/311
(58) Field of Search ................................. 382/311, 224, 382/225, 229, 100; 707/7

(56) References Cited

U.S. PATENT DOCUMENTS

| | | | |
|---|---|---|---|
| 5,455,875 A | | 10/1995 | Chevion et al. |
| 6,009,442 A | * | 12/1999 | Chen et al. .................. 715/522 |
| 6,243,724 B1 | * | 6/2001 | Mander et al. ............. 715/526 |
| 6,512,850 B2 | * | 1/2003 | Yaung ........................ 382/225 |
| 6,538,698 B1 | * | 3/2003 | Anderson .............. 348/333.05 |
| 6,654,739 B1 | * | 11/2003 | Apte et al. ..................... 707/5 |
| 2002/0188602 A1 | * | 12/2002 | Stubler et al. ................. 707/3 |

OTHER PUBLICATIONS

Srihari. "Automatic Indexing and Content–Based Retrieval of Captioned Photographs." Proc. of the 3$^{rd}$ Int. Conf. on Document Analysis and Recognition, vol. 2, Aug. 14, 1995, pp. 1165–1168.*

* cited by examiner

*Primary Examiner*—Jon Chang
(74) *Attorney, Agent, or Firm*—Browdy and Neimark, PLLC

(57) ABSTRACT

A method for data entry, includes receiving a plurality of images and sorting the images into an order responsive to a measure of similarity between the images, so as to group similar images together in the order. A first image among the images in the order is presented to an operator, and an input is received from the operator specifying a code to be assigned to the first image. A second image, subsequent to the first image among the images in the order, is then presented to the operator, along with the code specified by the operator for assignment to the first image. The code is assigned to the second image responsive to a single input action by the operator, indicating that the second image is to be assigned the same code as the first image.

27 Claims, 3 Drawing Sheets

SORTING IMAGES FOR IMPROVED DATA ENTRY PRODUCTIVITY

FIELD OF THE INVENTION

The present invention relates generally to methods and apparatus for data encoding, and specifically to methods for enhancing the efficiency of data key-in.

BACKGROUND OF THE INVENTION

There are many applications for data input from a hard copy to a computer system that use automated Optical Character Recognition (OCR), followed by manual verification of the OCR results. Human operators perform the verification step, either by reviewing all the fields in the original document, and correcting errors and rejects discovered in the OCR results, or by viewing and correcting only the characters or fields that have a low OCR confidence level. For example, U.S. Pat. No. 5,455,875, to Chevion et al., whose disclosure is incorporated herein by reference, describes a method for organizing data on a computer screen so as to improve productivity of human operators in verifying OCR results. The method is implemented in document processing systems produced by IBM Corporation (Armonk, N.Y.), in which the method is referred to as "SmartKey." Such OCR-based methods are useful as long as the OCR results are reliable, so that there are relatively few errors that the operator must correct.

Despite advances in the robustness of optical character recognition (OCR), there are still many document processing applications that do not achieve the requisite level of reliability for OCR-based processing. In these applications, it is necessary for human operators to key data into a computer terminal. The operator views either the paper document itself or an image of the document (or of a selected part of the document) and codes the document contents by typing letters and numbers into the terminal. This sort of manual coding is costly, and there is a need for techniques that can be used to reduce the amount of time that the operator spends keying in each document entry.

SUMMARY OF THE INVENTION

In preferred embodiments of the present invention, an operator codes entries that have been written in a given field in a plurality of form documents. To facilitate this process, an image of the given field is extracted from each of the documents. The field images are then sorted into an order according to a measure of similarity between the images, so that similar images are grouped together. The similarity measure is chosen so that the images in a given group are likely to have the same code, due to shared shape characteristics and/or other image features.

The field images are displayed to the operator one after another on a computer terminal. When the operator views the first image in a group of similar images, he or she keys in the appropriate code for the entry, typically by typing letters and/or numbers into the terminal as in conventional key-in systems. Because of the similarity between the entries in the group, it is likely that subsequent images in the same group will have the same code as the previous image. Therefore, after the operator has keyed in the code of the first image, this code is displayed alongside each of the subsequent images as they are presented to the operator. Then, instead of re-keying the entire code for each subsequent image, the operator can simply confirm that the displayed code is the correct one, preferably by a single input action, such as a single keystroke (such as <ENTER>) or mouse click. When the operator determines that a given entry should not have the same code as the preceding one, he or she keys in the new code for this entry. This new code preferably becomes the one that is displayed alongside subsequent images for operator confirmation.

This technique of sorting images for data key-in saves the operator considerable time and reduces the probability of error. It is particularly useful in large-scale key-in of form documents, in which the same word is likely to appear in a given field on many of the forms. It can also be used, however, in other image processing applications, in which an operator must code a large number of similar images.

There is therefore provided, in accordance with a preferred embodiment of the present invention, a method for data entry, including:

receiving a plurality of images;

sorting the images into an order responsive to a measure of similarity between the images, so as to group similar images together in the order;

presenting to an operator a first image among the images in the order, and receiving an input from the operator specifying a code to be assigned to the first image;

presenting to the operator a second image, subsequent to the first image among the images in the order, along with the code specified by the operator for assignment to the first image; and assigning the code to the second image responsive to a single input action by the operator, indicating that the second image is to be assigned the same code as the first image.

In a preferred embodiment, the plurality of the images include entries in fields in one or more form documents, wherein the one or more documents include multiple fields, and wherein receiving the plurality of the images includes extracting the entries from a selected one of the fields in the documents.

Typically, the images include alphanumeric characters, and the code includes alphanumeric codes input by the operator corresponding to the alphanumeric characters appearing in the first image. Preferably, sorting the images includes applying optical character recognition (OCR) to the images so as to associate OCR codes with the characters, and grouping the images according to the OCR codes. Most preferably, grouping the images includes finding at least an approximate match between a first string of the OCR codes associated with the characters in the first image and a second string of the OCR codes associated with the characters in the second image.

Preferably, the single input action includes a single keystroke on a keyboard. Further preferably, receiving the input from the operator specifying the code to be assigned to the first image includes receiving a first input specifying a first code, and the method includes, when the second image is not to be assigned the same code as the first image, receiving a second input from the operator specifying a second code to be assigned to the second image. Most preferably, the method includes presenting to the operator a third image, subsequent to the second image among the images in the order, along with the second code specified by the operator, and assigning the second code to the third image responsive to the single input action by the operator.

There is also provided, in accordance with a preferred embodiment of the present invention, data entry apparatus, including:

a memory, arranged to store a plurality of images;

a display;

a user input device; and an image processor, arranged to sort the images in the memory into an order responsive to a measure of similarity between the images so as to group similar images together in the order, and further arranged to drive the display so as to present to an operator a first image among the images in the order, and to receive an input from the operator via the user input device specifying a code to be assigned to the first image, and still further arranged to drive the display to present to the operator a second image, subsequent to the first image among the images in the order, along with the code specified by the operator for assignment to the first image, and to assign the code to the second image responsive to a single input action applied to the user input device by the operator indicating that the second image is to be assigned the same code as the first image.

There is additionally provided, in accordance with a preferred embodiment of the present invention, a computer software product, including a computer-readable medium in which program instructions are stored, which instructions, when read by a computer, cause the computer to receive and sort a plurality of images into an order responsive to a measure of similarity between the images so as to group similar images together in the order, and further cause the computer to present to an operator a first image among the images in the order, and to receive an input from the specifying a code to be assigned to the first image, and still further cause the computer to present to the operator a second image, subsequent to the first image among the images in the order, along with the code specified by the operator for assignment to the first image, and to assign the code to the second image responsive to a single input action by the operator indicating that the second image is to be assigned the same code as the first image.

The present invention will be more fully understood from the following detailed description of the preferred embodiments thereof, taken together with the drawings in which:

DETAILED DESCRIPTION OF PREFERRED EMBODIMENTS

Figure 1:
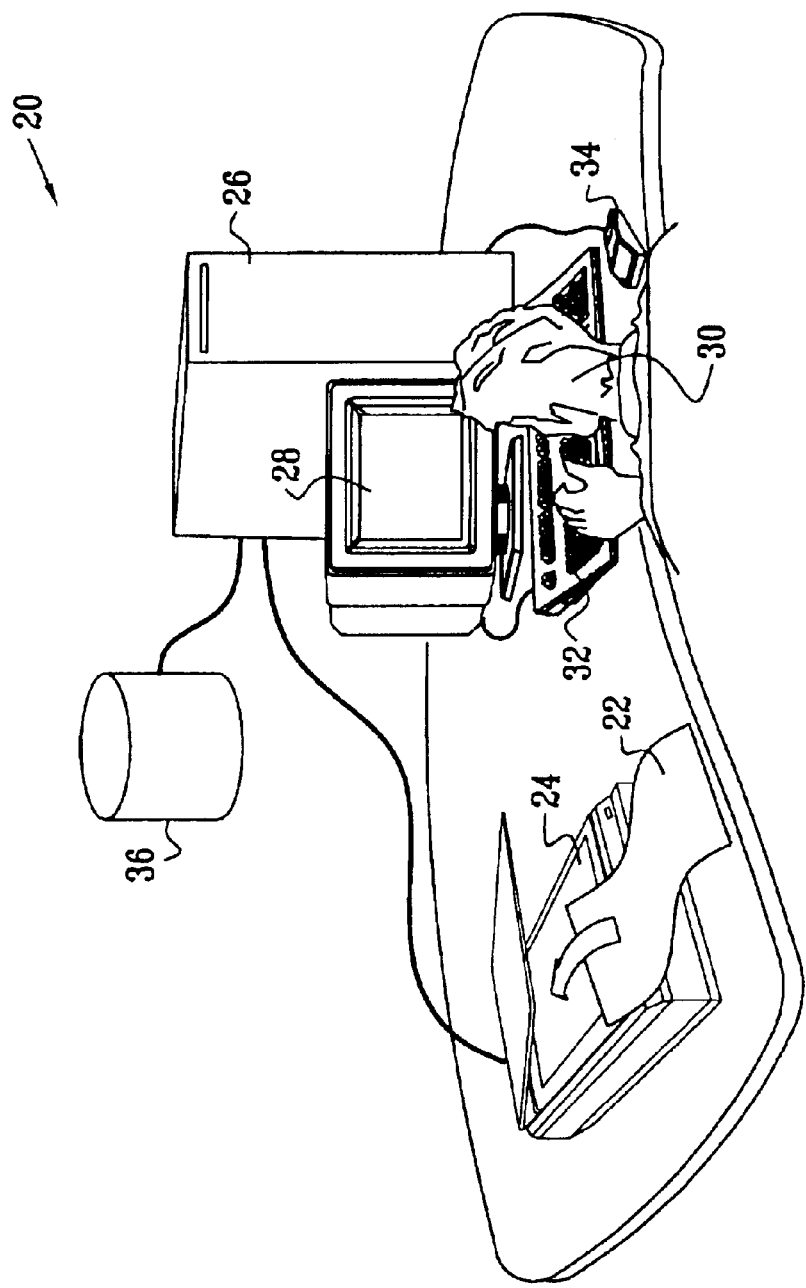
FIG. 1 is a schematic, pictorial illustration of a system for data key-in, in accordance with a preferred embodiment of the present invention.

FIG. 1 is a simplified pictorial illustration showing a system 20 for coding of information, in accordance with a preferred embodiment of the present invention. System 20 receives a document 22 for extraction of information therefrom. The document preferably comprises a preprinted form having fields that are filled in with contents. The contents typically comprise handwritten alphanumeric characters, although they may comprise symbols or marks of other types, generated by hand or by machine.

In order to extract information from document 22, a scanner 24 first captures an image of document 22 and conveys the corresponding image data to an image processor 26, which typically comprises a suitable general-purpose computer. Alternatively, the document image is input to the processor from another source, typically in electronic form. Processor 26 receives a large number of such images, stores them in a memory 36, and then processes and sorts them, as described in detail hereinbelow. The sorted images are displayed on a monitor screen 28 for viewing by an operator 30. The operator codes the images by keying in alphanumeric characters, using a keyboard 32. A pointing device, such as a mouse 34, is typically also provided.

Although for simplicity of illustration, all of the image sorting, display and other computerized functions of system 20 are shown as being performed by the single processor 26, it will be apparent to those skilled in the art these functions may easily be distributed among a number of different computers and/or terminals. These functions are preferably performed using software running on processor 26 and possibly on such other computers and/or terminals. The software may be supplied on tangible media, such as diskettes or CD-ROM, and loaded into the processor. Alternatively, the software may be downloaded to the processor via a network connection or other electronic link.

Figure 2:
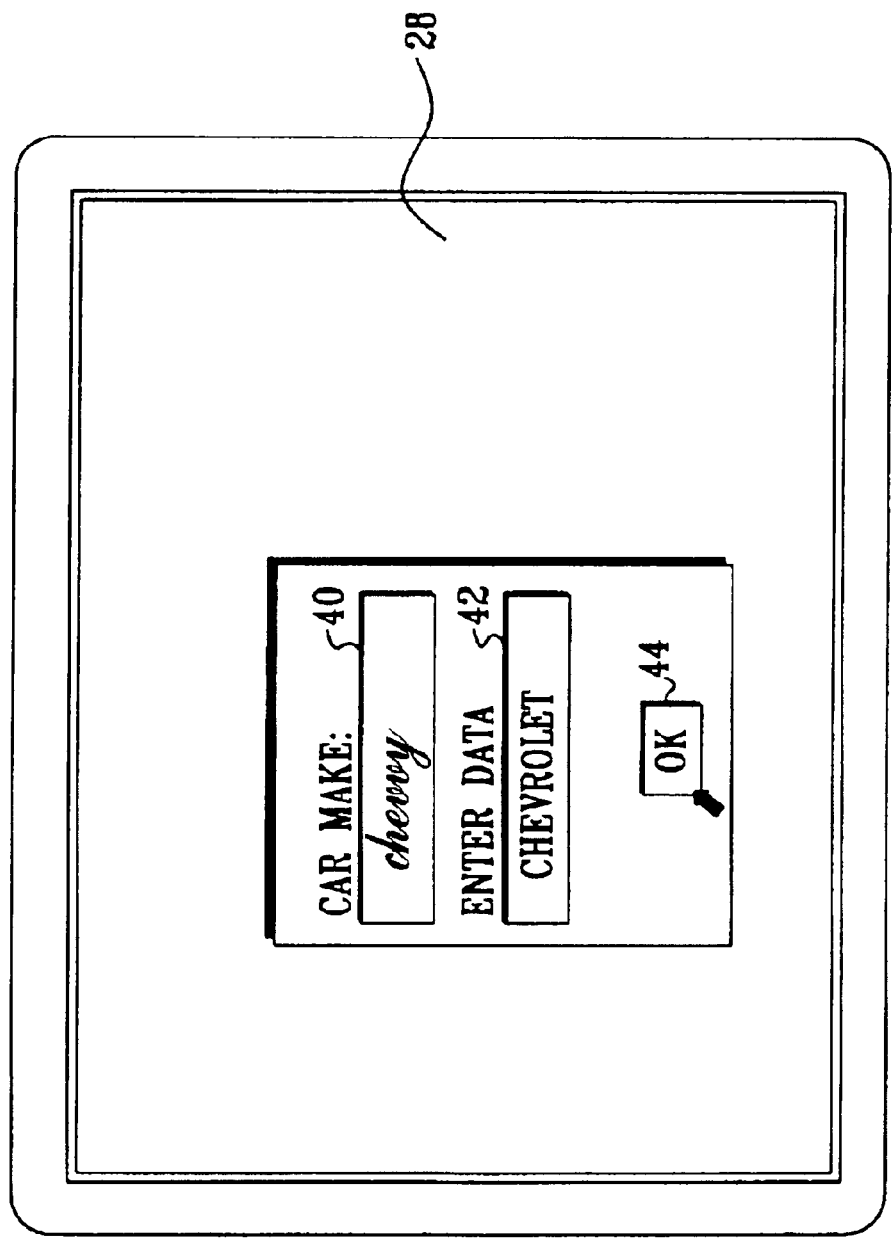
FIG. 2 is a schematic representation of a computer terminal display that is presented to a key-in operator, in accordance with a preferred embodiment of the present invention.

FIG. 2 is a schematic representation of screen 28, presenting information for coding by operator 30, in accordance with a preferred embodiment of the present invention. In this exemplary embodiment, document 22 is one of a large number of forms that include a field in which a person has written the make of a car. (For example, the forms may be copies of traffic tickets issued by policemen.) Processor 26 extracts images of the car make field from the forms in memory 36, and displays the handwritten car make from one of these forms in a display window 40. Alphanumeric characters corresponding to the car make in window 40 are entered in a data window 42. The characters may be typed into window 42 by operator 30, or they may alternatively be presented by processor 26 for confirmation by the operator, as described hereinbelow. The operator confirms that the data in window 42 represent the correct coding of the image in window 40 by a single action, such as a keystroke (typically <ENTER>) on keyboard 32 or a mouse click on an on-screen button 44, or on another appropriate on-screen control.

Figure 3:
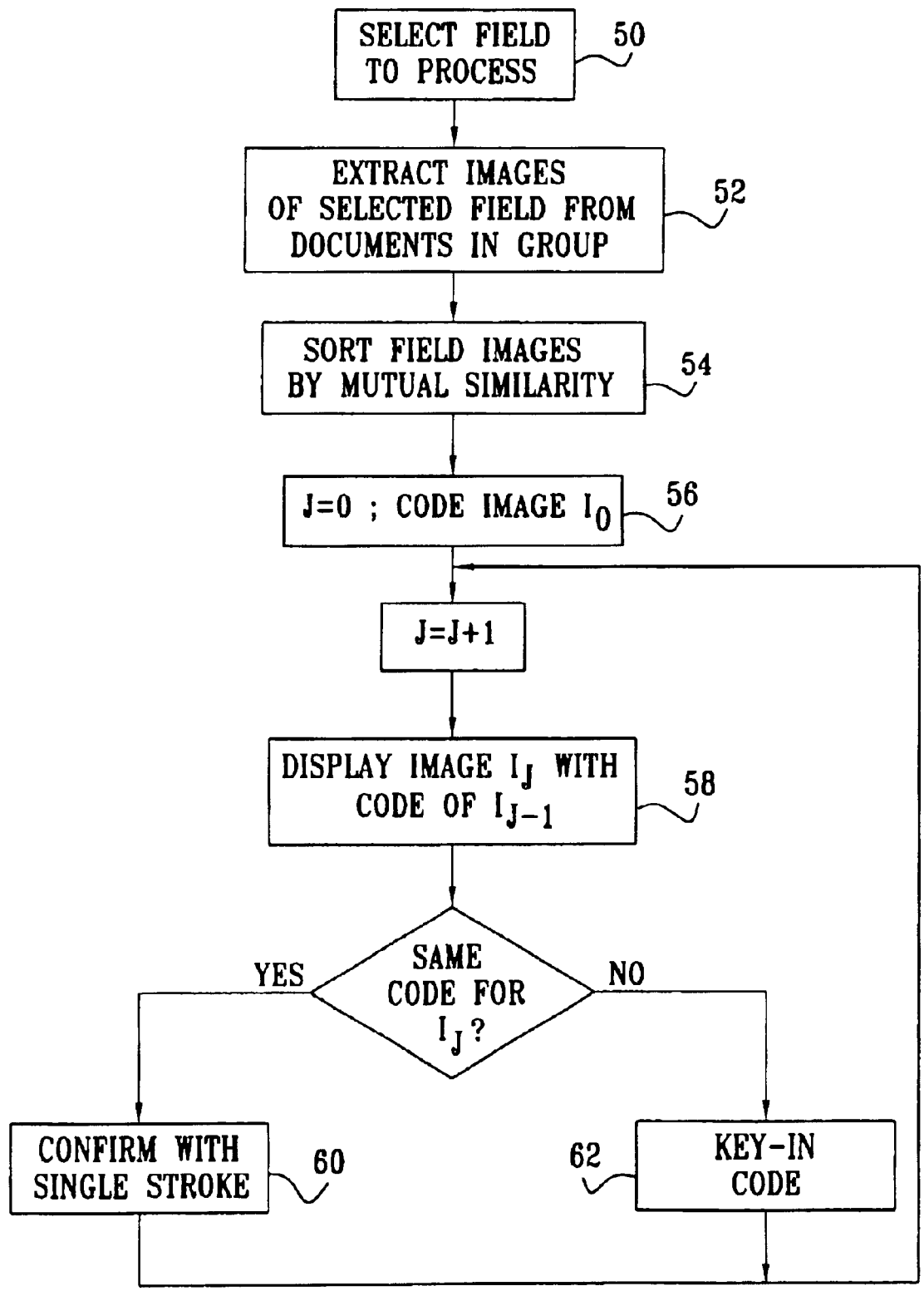
FIG. 3 is a flow chart that schematically illustrates a method for data key-in, in accordance with a preferred embodiment of the present invention.

FIG. 3 is a flow chart that schematically illustrates a method for data coding by operator 30, in accordance with a preferred embodiment of the present invention. After processor 26 has stored a large number of forms of the same type in memory 36, it selects one of the fields in the forms to process, at a selection step 50. For example, the processor may select the car make field, as illustrated in FIG. 2, either autonomously or under the control of operator 30. The processor extracts the contents of the selected field from each of the form images, at an extraction step 52.

Before presenting the field images to operator 30, processor 26 sorts and groups the images based on mutual similarity, at a sorting step 54. There are many methods known in the art for measuring similarities between pairs and groups of images, and substantially any such method may be used at this step. Preferably, each of the field images is analyzed by OCR to give a respective string of characters, and a string-matching algorithm is applied to sort the images. Even when the OCR results are unreliable or incomplete, they are generally still adequate for error-tolerant string matching, as is known in the art. In the example shown in FIG. 2, the handwritten entry "chevvy" has been found to be a close enough match to "Chevrolet" to be placed in the same group. Misspellings and undecipherable characters are likewise preferably ignored in the string matching process. In longer entries, containing multiple words, images may be grouped together when they are found to contain one or more words in common.

Alternatively, morphological criteria may be used in sorting the field images. For example, lines, arcs and loops may be identified in the images, and used in constructing a vector representing the image features. The images can then be grouped and sorted by measuring vector distances between them. Further alternatively, the images may be compared and sorted by pixelwise correlation with one another or with one or more templates. This latter technique is useful particularly when the images to be coded are pictures of people or of objects, rather than containing characters and words. Other methods of sorting and grouping images will be apparent to those skilled in the art.

Processor 26 presents the field images in window 40 on display 28 in their sorted order, beginning with a first image $I_0$, at an initial coding step 56. Operator 30 keys in the appropriate alphanumeric characters to code the first image, and then confirms that the coding (which appears in window 42) is correct. In the present example, assume that the first image was coded as "Chevrolet." Processor 26 then displays the next image $I_1$ in window 40, alongside the code assigned to image $I_0$ in window 42, at a display step 58. This is the situation pictured in FIG. 2. Operator 30 decides whether the code appearing in window 42 is the correct one for the current entry, at a decision step 59. If so, the operator can simply confirm the code with a single stroke, either by clicking mouse 34 or pressing an appropriate key on keyboard 32, at a confirmation step 60. If the code in window 42 is not the appropriate one for the current entry, the operator keys in the new code, at a key-in step 62.

Processor 26 then goes on to the next image, $I_2$, and repeats steps 58 through 62. If a new code was entered in the previous iteration at step 62, this is preferably the code that is displayed in window 42 during the next iteration at step 58. Steps 58 through 62 are repeated iteratively in this manner for the entire collection of field images, until all of the images have been coded.

Although the preferred embodiment described above deals with key-in of words appearing in a plurality of form documents, the principles of the present invention may also be applied in other image processing and data key-in applications in which an operator must code a large number of similar images. For example, the method described above may also be used in coding the contents of multiple fields of the same type that appear on a single document. Furthermore, as noted above, the principles of the present invention may be applied not only to coding of alphanumeric characters, but also to coding other types of symbols, as well as images of people and objects. For example, in an alternative embodiment of the present invention, the system and method described above can be applied to face identification.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for data entry, comprising:
   receiving a plurality of images;
   sorting the images into an order responsive to a measure of similarity between the images, so as to group similar images together in the order;
   presenting to an operator a first image among the images in the order, and receiving an input from the operator specifying a code to be assigned to the first image;
   presenting to the operator a second image, subsequent to the first image among the images in the order, along with the code specified by the operator for assignment to the first image; and
   assigning the code to the second image responsive to a single input action by the operator, indicating that the second image is to be assigned the same code as the first image.

2. A method according to claim 1, wherein the plurality of the images comprise entries in fields in one or more form documents.

3. A method according to claim 2, wherein the one or more documents comprise multiple fields, and wherein receiving the plurality of the images comprises extracting the entries from a selected one of the fields in the documents.

4. A method according to claim 1, wherein the images comprise alphanumeric characters, and wherein the code comprises alphanumeric codes input by the operator corresponding to the alphanumeric characters appearing in the first image.

5. A method according to claim 4, wherein sorting the images comprises applying optical character recognition (OCR) to the images so as to associate OCR codes with the characters, and grouping the images according to the OCR codes.

6. A method according to claim 5, wherein grouping the images comprises finding at least an approximate match between a first string of the OCR codes associated with the characters in the first image and a second string of the OCR codes associated with the characters in the second image.

7. A method according to claim 1, wherein the single input action comprises a single keystroke on a keyboard.

8. A method according to claim 1, wherein receiving the input from the operator specifying the code to be assigned to the first image comprises receiving a first input specifying a first code, and comprising, when the second image is not to be assigned the same code as the first image, receiving a second input from the operator specifying a second code to be assigned to the second image.

9. A method according to claim 8, and comprising presenting to the operator a third image, subsequent to the second image among the images in the order, along with the second code specified by the operator, and assigning the second code to the third image responsive to the single input action by the operator.

10. Data entry apparatus, comprising:
    a memory, arranged to store a plurality of images;
    a display;
    a user input device; and
    an image processor, arranged to sort the images in the memory into an order responsive to a measure of similarity between the images so as to group similar images together in the order, and further arranged to drive the display so as to present to an operator a first image among the images in the order, and to receive an input from the operator via the user input device specifying a code to be assigned to the first image, and still further arranged to drive the display to present to the operator a second image, subsequent to the first image among the images in the order, along with the code specified by the operator for assignment to the first image, and to assign the code to the second image responsive to a single input action applied to the user input device by the operator indicating that the second image is to be assigned the same code as the first image.

11. Apparatus according to claim 10, wherein the plurality of the images comprise entries in fields in one or more form documents.

12. Apparatus according to claim 11, wherein the one or more documents comprise multiple fields, and wherein the processor is arranged to extract the entries from a selected one of the fields in the documents.

13. Apparatus according to claim 10, wherein the images comprise alphanumeric characters, and wherein the code comprises alphanumeric codes input by the operator corresponding to the alphanumeric characters appearing in the first image.

14. Apparatus according to claim 13, wherein the processor is arranged to apply optical character recognition (OCR) to the images so as to associate OCR codes with the characters, and to sort the images according to the OCR codes.

15. Apparatus according to claim 14, wherein the processor is arranged to find at least an approximate match between a first string of the OCR codes associated with the characters in the first image and a second string of the OCR codes associated with the characters in the second image.

16. Apparatus according to claim 10, wherein the user input device comprises a keyboard, and wherein the single input action comprises a single keystroke on the keyboard.

17. Apparatus according to claim 10, wherein the input from the operator specifying the code to be assigned to the first image comprises a first input specifying a first code, and wherein the processor is arranged, when the second image is not to be assigned the same code as the first image, to receive a second input from the operator specifying a second code to be assigned to the second image.

18. Apparatus according to claim 17, wherein the processor is further arranged to present to the operator a third image, subsequent to the second image among the images in the order, along with the second code specified by the operator, and to assign the second code to the third image responsive to the single input action by the operator.

19. A computer software product, comprising a computer-readable medium in which program instructions are stored, which instructions, when read by a computer, cause the computer to receive and sort a plurality of images into an order responsive to a measure of similarity between the images so as to group similar images together in the order, and further cause the computer to present to an operator a first image among the images in the order, and to receive an input from the specifying a code to be assigned to the first image, and still further cause the computer to present to the operator a second image, subsequent to the first image among the images in the order, along with the code specified by the operator for assignment to the first image, and to assign the code to the second image responsive to a single input action by the operator indicating that the second image is to be assigned the same code as the first image.

20. A product according to claim 19, wherein the plurality of the images comprise entries in fields in one or more form documents.

21. A product according to claim 20, wherein the one or more documents comprise multiple fields, and wherein the instructions cause the computer to extract the entries from a selected one of the fields in the documents.

22. A product according to claim 19, wherein the images comprise alphanumeric characters, and wherein the code comprises alphanumeric codes input by the operator corresponding to the alphanumeric characters appearing in the first image.

23. A product according to claim 22, wherein the instructions cause the processor to apply optical character recognition (OCR) to the images so as to associate OCR codes with the characters, and to sort the images according to the OCR codes.

24. A product according to claim 23, wherein the instructions cause the processor to find at least an approximate match between a first string of the OCR codes associated with the characters in the first image and a second string of the OCR codes associated with the characters in the second image.

25. A product according to claim 19, wherein the single input action comprises a single keystroke on a keyboard.

26. A product according to claim 19, wherein the input from the operator specifying the code to be assigned to the first image comprises a first input specifying a first code, and wherein the instructions cause the computer, when the second image is not to be assigned the same code as the first image, to receive a second input from the operator specifying a second code to be assigned to the second image.

27. A product according to claim 26, wherein the instructions further cause the processor to present to the operator a third image, subsequent to the second image among the images in the order, along with the second code specified by the operator, and to assign the second code to the third image responsive to the single input action by the operator.

* * * * *